United States Patent
Scoville et al.

(10) Patent No.: US 11,542,120 B2
(45) Date of Patent: Jan. 3, 2023

(54) ASSOCIATED MOBILE ELEVATOR CALLS

(71) Applicant: Otis Elevator Company, Farmington, CT (US)

(72) Inventors: Bradley Armand Scoville, Farmington, CT (US); Paul A. Simcik, Southington, CT (US); Harrison Daniels, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1107 days.

(21) Appl. No.: 16/169,046

(22) Filed: Oct. 24, 2018

(65) Prior Publication Data

US 2020/0130993 A1   Apr. 30, 2020

(51) Int. Cl.
| | |
|---|---|
| B66B 1/46 | (2006.01) |
| B66B 1/24 | (2006.01) |
| B66B 1/34 | (2006.01) |
| G01S 1/08 | (2006.01) |

(52) U.S. Cl.
CPC ............ B66B 1/468 (2013.01); B66B 1/2458 (2013.01); B66B 1/3461 (2013.01); G01S 1/08 (2013.01); B66B 2201/103 (2013.01); B66B 2201/223 (2013.01)

(58) Field of Classification Search
CPC ............ B66B 1/468; B66B 2201/4653; B66B 2201/4615; B66B 1/3461; B66B 2201/103; B66B 2201/4638; B66B 1/52; B66B 2201/4607; B66B 1/46
See application file for complete search history.

(56) References Cited

U.S. PATENT DOCUMENTS

| | | | |
|---|---|---|---|
| 7,994,910 B2 | 8/2011 | Brooks et al. | |
| 8,047,333 B2 | 11/2011 | Finschi | |
| 8,387,757 B2 | 3/2013 | Christy et al. | |
| 9,731,934 B2 | 8/2017 | Stanley et al. | |
| 9,896,305 B2 * | 2/2018 | Blandin | B66B 1/3461 |

(Continued)

FOREIGN PATENT DOCUMENTS

| | | |
|---|---|---|
| CN | 103987642 A | 8/2014 |
| CN | 106032233 B | 10/2016 |

(Continued)

OTHER PUBLICATIONS

Chinese Office Action for Application No. 201911011709.0; dated Sep. 1, 2021; 10 Pages.
European Search Report for Application No. 19204538.3; dated Mar. 26, 2020; 10 Pages.

*Primary Examiner* — Marlon T Fletcher
(74) *Attorney, Agent, or Firm* — Cantor Colburn LLP

(57) ABSTRACT

A method of operating an elevator call control system comprising: receiving a first elevator call from a first individual carrying a first mobile device, the first elevator call including a destination request to travel from a first boarding floor to a first destination floor; determining that the first individual carrying the first mobile device is traveling with a second individual, wherein the second individual is traveling to a second destination floor; assigning an elevator car to the first elevator call; and scheduling the elevator car to transport the first individual carrying the first mobile device and the second individual together to at least one of a first destination floor and the second destination floor.

19 Claims, 4 Drawing Sheets

(56) References Cited

U.S. PATENT DOCUMENTS

| | | | |
|---|---|---|---|
| 9,957,132 B2 | 5/2018 | Berryhill | |
| 9,988,237 B1 | 6/2018 | Arguedas et al. | |
| 10,647,545 B2 * | 5/2020 | Scoville | B66B 1/468 |
| 2008/0236956 A1 | 10/2008 | Finschi | |
| 2016/0251198 A1 | 9/2016 | Salmikuukka et al. | |
| 2016/0325962 A1 | 11/2016 | Blandin et al. | |
| 2016/0368732 A1 | 12/2016 | Zhao et al. | |
| 2017/0260024 A1 | 9/2017 | Sha et al. | |
| 2018/0099840 A1 | 4/2018 | Armistead | |
| 2019/0002237 A1 * | 1/2019 | Scoville | B66B 1/468 |
| 2019/0300333 A1 * | 10/2019 | Simcik | B66B 1/28 |
| 2020/0130987 A1 * | 4/2020 | Scoville | B66B 1/468 |
| 2020/0130988 A1 * | 4/2020 | Gou | H04W 4/021 |
| 2020/0307952 A1 * | 10/2020 | Wei | B66B 1/468 |

FOREIGN PATENT DOCUMENTS

| | | | | |
|---|---|---|---|---|
| CN | 108016958 A | * | 5/2018 | B66B 1/468 |
| CN | 109071152 A | * | 12/2018 | B66B 1/2408 |
| CN | 109573752 A | * | 4/2019 | B66B 1/06 |
| CN | 110304500 A | * | 10/2019 | B66B 1/06 |
| EP | 2782860 A1 | | 10/2014 | |
| EP | 3421402 A1 | * | 1/2019 | B66B 1/14 |
| EP | 3643661 A1 | * | 4/2020 | B66B 1/2458 |
| KR | 101146939 B1 | | 5/2012 | |
| WO | WO-2015180771 A1 | * | 12/2015 | B66B 1/468 |
| WO | 2016194231 A1 | | 12/2016 | |
| WO | WO-2017175020 A1 | * | 10/2017 | B66B 1/3461 |

* cited by examiner

ASSOCIATED MOBILE ELEVATOR CALLS

BACKGROUND

The subject matter disclosed herein generally relates to the field of elevator systems, and more particularly to an apparatus and method for calling elevator cars within the elevator system.

Existing elevator systems allow a user to submit an elevator call (e.g., a hall call or a destination call) using their own mobile device (e.g., a smartphone).

BRIEF SUMMARY

According to one embodiment, a method of operating an elevator call control system is provided. The method including: receiving a first elevator call from a first individual carrying a first mobile device, the first elevator call including a destination request to travel from a first boarding floor to a first destination floor; determining that the first individual carrying the first mobile device is traveling with a second individual, wherein the second individual is traveling to a second destination floor; assigning an elevator car to the first elevator call; and scheduling the elevator car to transport the first individual carrying the first mobile device and the second individual together to at least one of a first destination floor and the second destination floor.

In addition to one or more of the features described above, or as an alternative, further embodiments may include that determining that the first individual carrying the first mobile device is traveling with a second individual further includes: receiving a selection input from the first mobile device indicating that the second individual is traveling with the first individual.

In addition to one or more of the features described above, or as an alternative, further embodiments may include: determining that the second individual is located on a second boarding floor different than the first boarding floor.

In addition to one or more of the features described above, or as an alternative, further embodiments may include that determining that the second individual is located on a second boarding floor different than the first boarding floor further includes: receiving a selection input from the mobile device indicating that the second individual is located on a second boarding floor different than the first boarding floor.

In addition to one or more of the features described above, or as an alternative, further embodiments may include that determining that the second individual is located on a second boarding floor different than the first boarding floor further includes: detecting a location of a second mobile device carried by the second individual.

In addition to one or more of the features described above, or as an alternative, further embodiments may include that determining that the first individual carrying the first mobile device is traveling with a second individual further includes: detecting a location of a second mobile device carried by the second individual; detecting a location of the first mobile device; and determining that the second mobile device is within a selected range of the first mobile device.

In addition to one or more of the features described above, or as an alternative, further embodiments may include that the second mobile device is determined to be within the selected range of the first mobile device when the first elevator call is received.

In addition to one or more of the features described above, or as an alternative, further embodiments may include that the second mobile device is determined to be within the selected range of the first mobile device when the elevator car arrives at the first boarding floor.

In addition to one or more of the features described above, or as an alternative, further embodiments may include that determining that the first individual carrying the first mobile device is traveling with a second individual further includes: quarrying at least one of a social media network and a hotel visitor guest database to determine whether the second individual is traveling with the first individual.

In addition to one or more of the features described above, or as an alternative, further embodiments may include that the first destination floor and the second destination floor are the same.

In addition to one or more of the features described above, or as an alternative, further embodiments may include that the first destination floor and the second destination floor are different.

In addition to one or more of the features described above, or as an alternative, further embodiments may include: determining the first destination floor and the second destination floor.

In addition to one or more of the features described above, or as an alternative, further embodiments may include that determining the first destination floor and the second destination floor further includes: receiving a selection input from the first mobile device indicating the first destination floor and the second destination floor.

In addition to one or more of the features described above, or as an alternative, further embodiments may include that determining the first destination floor and the second destination floor further includes: quarrying at least one of a social media network and a hotel visitor guest database to determine the first destination floor and the second destination floor.

In addition to one or more of the features described above, or as an alternative, further embodiments may include that detecting a location of the second mobile device further includes: connecting, using a building sensor, to the second mobile device via at least one of Wi-Fi and Bluetooth; and determining a distance between the building sensor and the second mobile device.

In addition to one or more of the features described above, or as an alternative, further embodiments may include that detecting a location of the second mobile device further includes: detecting, using a building sensor, a wireless signal of the second mobile device, wherein the building sensor does not connect to the wireless signal; and determining a distance between the building sensor and the second mobile device.

In addition to one or more of the features described above, or as an alternative, further embodiments may include that detecting a location of the second mobile device further includes: detecting a beacon transmitted by a building sensor using the second mobile device; and determining a distance between the building sensor and the second mobile device in response to a strength of the beacon.

According to another embodiment, an elevator system including: an elevator car; and a system controller including: a processor; and a memory including computer-executable instructions that, when executed by the processor, cause the processor to perform operations, the operations including: receiving a first elevator call from a first individual carrying a first mobile device, the first elevator call including a destination request to travel from a first boarding floor to a first destination floor; determining that the first individual carrying the first mobile device is traveling with a second individual, wherein the second individual is traveling to a second destination floor; assigning an elevator car to the first elevator call; and scheduling the elevator car to transport the first individual carrying the first mobile device and the second individual together to at least one of a first destination floor and the second destination floor.

According to another embodiment, a computer program product tangibly embodied on a computer readable medium is provided. The computer program product including instructions that, when executed by a processor, cause the processor to perform operations including: receiving a first elevator call from a first individual carrying a first mobile device, the first elevator call including a destination request to travel from a first boarding floor to a first destination floor; determining that the first individual carrying the first mobile device is traveling with a second individual, wherein the second individual is traveling to a second destination floor; assigning an elevator car to the first elevator call; and scheduling the elevator car to transport the first individual carrying the first mobile device and the second individual together to at least one of a first destination floor and the second destination floor.

Technical effects of embodiments of the present disclosure include determining how many other individuals piggy back on a single elevator call by tracking the location of mobile devices.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
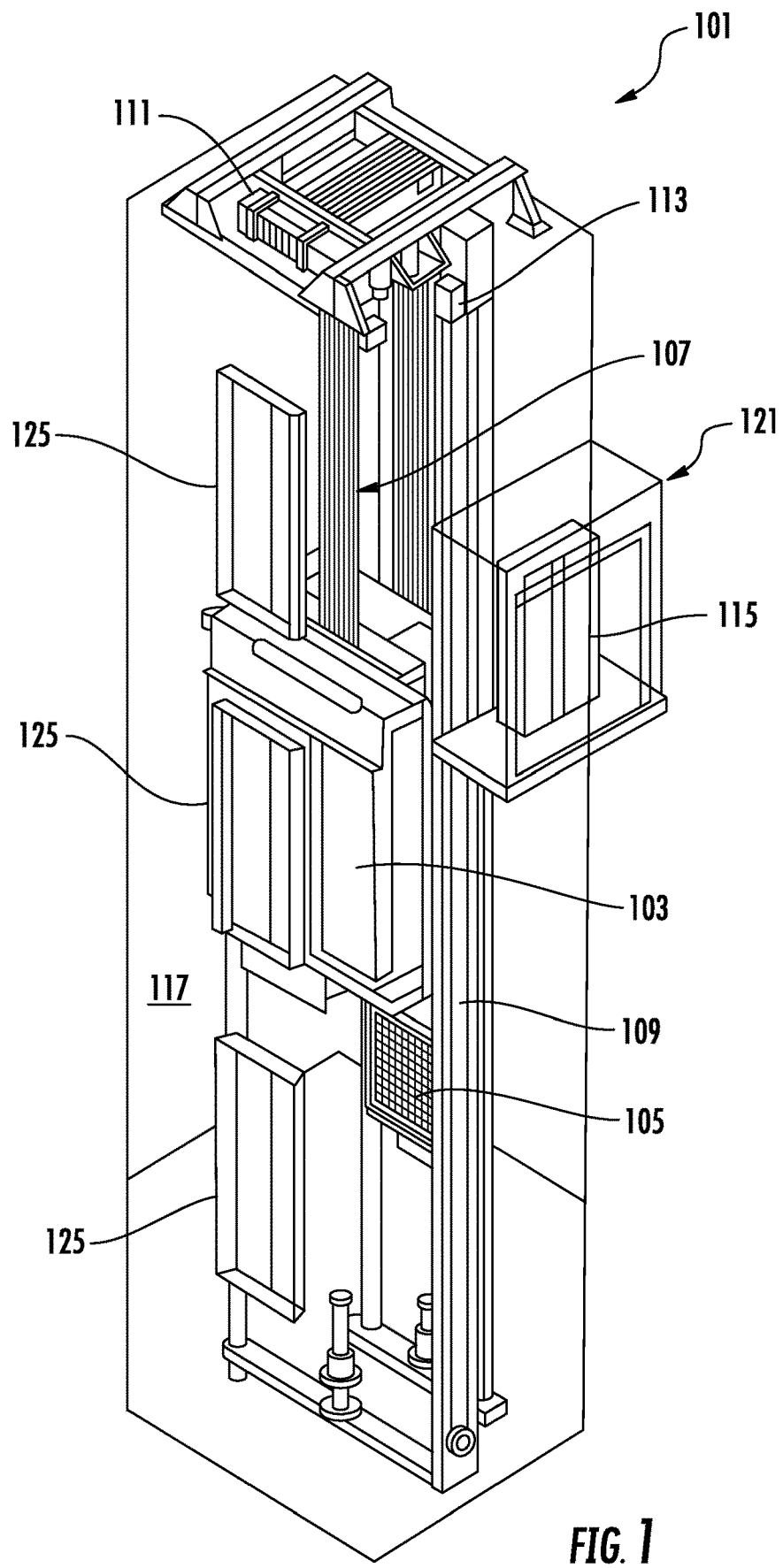
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
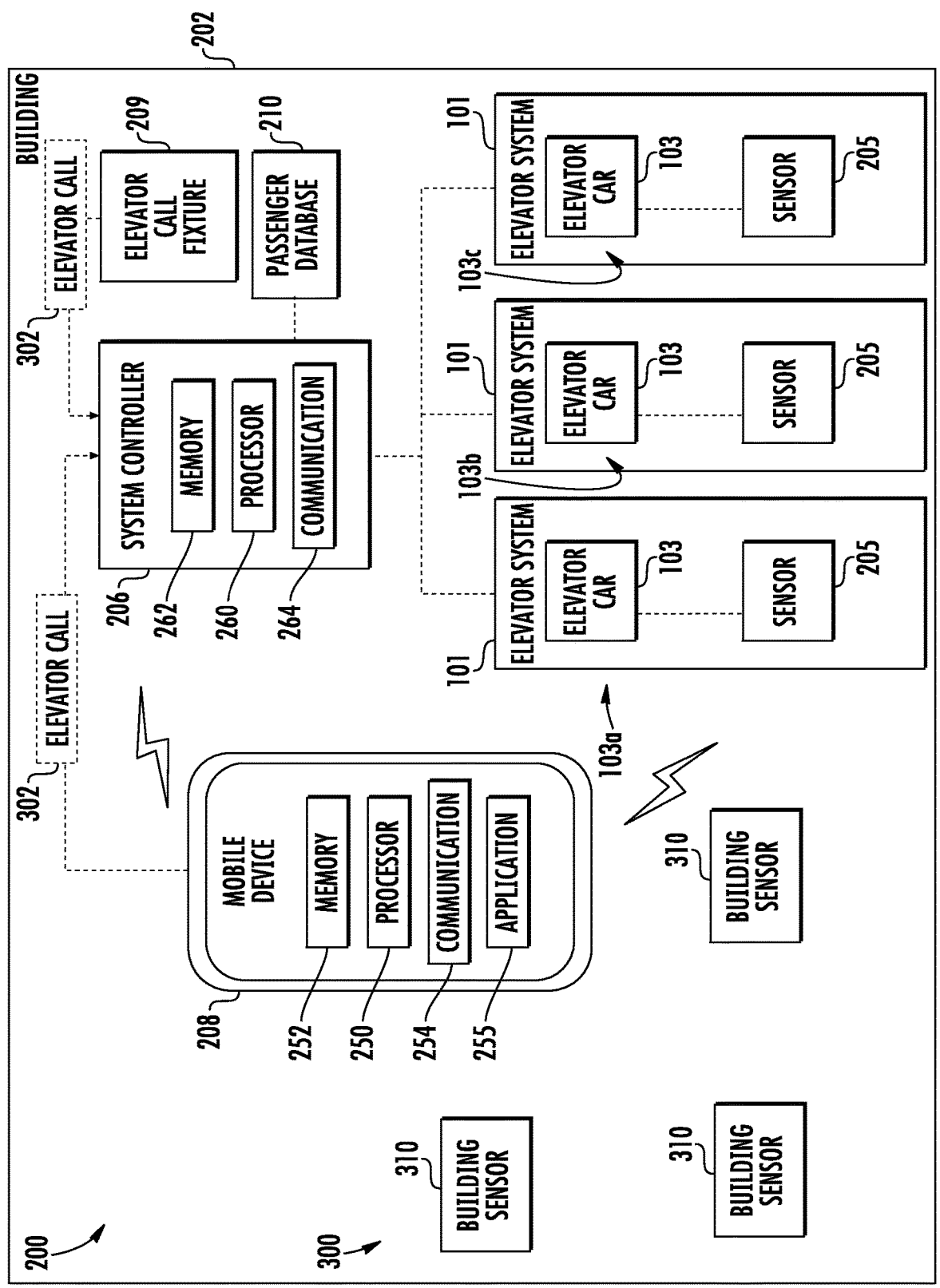
FIG. 2 illustrates a schematic view of an elevator call control system, in accordance with an embodiment of the disclosure.

FIG. 2 depicts an elevator call control system 200 in an example embodiment. The elevator call control system 200 includes one or more elevator system 101 installed at a building 202. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance devices, such as the elevator system 101.

The elevator system 101 may be operably connected to one or more computing devices, such as a system controller 206. The system controller 206 may be configured to control dispatching operations for one or more elevator cars 103 associated with one or more elevator systems 101. It is understood that the elevator system 101 may utilize more than one system controller 206. Although three elevator systems 101 are shown in FIG. 2, it is understood that any number of elevator systems 101 may be utilized. Additional, although each elevator system 101 is illustrated as having one elevator car 103, it is understood that any number of elevators cars 103 may be used each elevator system 101. The elevator cars 103 of FIG. 2 may be referred to also as a first elevator car 103a, a second elevator car 103b, and a third elevator car 103c. It is understood that other components of the elevator system 101 (e.g., drive, counterweight, safeties, etc.) are not depicted for ease of illustration in FIG. 2.

The system controller 206 may include a processor 260, memory 262 and communication module 264, as shown in FIG. 2. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the system controller 206 including executable instructions stored therein, for instance, as firmware. The communication module 264 may implement one or more communication protocols as described in further detail herein.

The system controller 206 may include and/or be in electronic communication with a passenger database 210. The passenger database 210 may be local and/or remote to the system controller 206. Although, only shown as a single database, the passenger database 210 may comprise multiple individual databases that are each either local or remote. The system controller 206 may be connected to the passenger database 210 through a cloud computing network or any other desired communication system. The passenger database 206 may container information regarding relationships among passengers that may take an elevator car 103 of the elevator call control system 200. For example, the passenger database 206 may contain information indicating whether two or more passengers may desire to travel together within a single elevator car 103. For example, the two passengers may be family, teammates, friends, coworkers, partners, or the passengers may have any other relationship status that may indicate that they would like to share an elevator car 103. In one embodiment, the passenger database 110 is a meeting calendar/schedule that may know when one or more passengers intend to travel together to the same meeting or away from the same meeting. In one embodiment, the passenger database 110 is a social media network. In one embodiment, the passenger database 110 is a hotel visitor guest database or an employer database. For example, when checking in to a hotel or creating a hotel account, an individual may identify other individuals that they will be traveling with during their stay at the hotel. In another example, the passenger database 110 may also include employment information, such as, for example, where the passenger works, what group the passenger works in, what is the passenger's employment rank in the business. The passenger database 210 also may include the floors (i.e., landings) where potential passengers of the elevator car 103 may be staying in at hotel or floors where potential passengers will working on in an office building.

Also shown in FIG. 2 is a mobile device 208. The mobile device 208 may be a mobile computing device that is typically carried by a person, such as, for example a smart phone, PDA, smart watch, tablet, laptop, etc. The mobile device 208 may include a touch screen (not shown). The mobile device 208 may include a processor 250, memory 252 and communication module 254 as shown in FIG. 2. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the mobile device 208 including executable instructions stored therein, for instance, as firmware. The communication module 254 may implement one or more communication protocols as described in further detail herein. The mobile device 208 belongs to a resident or employee of the building 202 who currently has access to the elevator system 101.

Each mobile device 208 may transmit an elevator call 302 to the system controller 206 and the system controller 206 will move an elevator car 103 in response to the elevator call 302. The elevator call 302 may also be transmitted from an elevator call fixture 209. The elevator call fixture 209 may be located in an elevator lobby proximate the elevator system 101. The elevator call fixture 209 may be stationary. Multiple different individuals may submit an elevator call 302 via the elevator call fixture 209.

The elevator call 302 may include a "boarding floor" and a "destination floor." The "boarding floor" is where the person with the mobile device 208 desires to board the elevator car 103 and the "destination floor" is where the person with the mobile device 208 intends to travel. In one embodiment, the elevator call 302 may only include the "destination floor" and the "boarding floor" may be automatically determined by the elevator system 101. Embodiments herein generate a graphical user interface on the mobile device 208 through an application 255. The mobile device 208 may transmit an elevator call 302 through an application 255.

The mobile device 208 and the system controller 206 communicate with one another. For example, the mobile device 208 and the system controller 206 may communicate with one another when proximate to one another (e.g., within a threshold distance). The mobile device 208 and the system controller 206 may communicate over a wireless network, such as 802.11x (Wi-Fi), short-range radio (Bluetooth), cellular, satellite, etc. In some embodiments, the system controller 206 may include, or be associated with (e.g., communicatively coupled to) a networked element, such as kiosk, beacon, hall call fixture, lantern, bridge, router, network node, door lock, elevator control panel, building intercom system, etc. The networked element may communicate with the mobile device 208 using one or more communication protocols or standards. For example, the networked element may communicate with the mobile device 208 using near field communications (NFC). A connection between the mobile device 208 and the system controller 206 may be direct between mobile device 208 and system controller 206 or it may be through a web service.

The connection also may include security elements such as VPN or authentication or encryption. In other embodiments, the system controller 206 may establish connection with a mobile device 208 that is inside and/or outside of the building 202 in order to detect a location of the mobile device 208. A location of the mobile device may be determined using various technologies including GPS, triangulation, trilateration, signal strength detection, accelerometer detection, gyroscopic detection, or barometric pressure sensing by way of non-limiting example. The triangulation and trilateration may use various wireless technologies including but not limited to Wi-Fi and Bluetooth. In example embodiments, the mobile device 208 communicates with the system controller 206 over multiple independent wired and/or wireless networks. Embodiments are intended to cover a wide variety of types of communication between the mobile device 208 and system controller 206, and embodiments are not limited to the examples provided in this disclosure. Communication between the mobile device 208 and the system controller 206 will allow the system controller 206 to determine the location of the mobile device 208 in relation to the elevator system 101. The location of the mobile device 208 may be communicated to the system controller 206 through a plurality of sensors 205, discussed further below.

Each elevator system 101 may also include a sensor 205 configured to detect whether a mobile device 208 has entered the elevator car 103. In an embodiment, the sensor 205 may be located on the elevator car 103. The system controller 206 is in electronic communication with each sensor 205 through a wired connection and/or wireless connection. In an alternative embodiment, each sensor may be in indirect communication with the system controller 206 through the mobile device 208. In a non-limiting example, if the sensors 205 are a Bluetooth beacon, then the mobile device 208 can detect when it is in proximity of the sensor 205, then the mobile device 208 can communicate with the system controller 206 that it is in the elevator car 103.

Further, although only one sensor 205 is shown per elevator car 103 for ease of illustration it is understood that each elevator car 103 may contain one or more sensors 205. Each sensor 205 may also be configured to detect operational data of the elevator car 103, such as for example, elevator door position (e.g. open/closed), elevator car location, speed, voltage, vibration, acceleration, noise, deceleration, jerk, and any other performance parameter of any component of the elevator system 103 known to one of skill in the art.

The sensors 205 detect the presence of an individual in an elevator car 103 and identify the individual using various sensing technology, such as, for example Wi-Fi transceivers, Bluetooth transceivers, radio transceivers, visual recognition cameras, people counters, microphones, etc. to detect persons and/or mobile devices entering and leaving the elevator car. The type and nature of sensors 205 within the sensor system 101 is not limited to the embodiments disclosed herein. The mobile device 208 and the sensors 205 communicate with one another. For example, the mobile device 208 and the sensors 205 may communicate with one another when proximate to one another (e.g., within a threshold distance). The mobile device 208 and the sensors 205 may communicate over a wireless network, such as 802.11x (Wi-Fi), ZigBee, Z-Wave and short-range radio (Bluetooth).

In an embodiment, the sensors 205 may include a Wi-Fi transceiver to connect to a mobile device 208 when the mobile device 208 enters the elevator car 103 in order to identify the mobile device 208. In another embodiment, the sensors 205 may include a Bluetooth transceiver to connect to a mobile device 208 when the mobile device 208 enters the elevator car 103 in order to identify the mobile device 208. The sensors 205 are configured to detect a distance between the elevator car 103 and the mobile device 208 to determine whether the mobile device 208 is entering and/or leaving the elevator car 103. The sensors 205 may be configured to detect a distance between the elevator car 103 and the mobile device 208 through wireless signal strength detection.

Communication between the mobile device 208 and the sensors 205 can be one-way or two-way communication. In one example, if Bluetooth is utilized then the mobile device 208 may advertise a Bluetooth signal and the sensors 205 may receive it. In another example, the sensors 205 may advertise a Bluetooth signal and the mobile device 208 may receive it. In another example, there may be two-way Bluetooth communication between the sensors 205 and the mobile device 208. In another example, a Wi-Fi transceiver (i.e. sensor 205) may be placed in an elevator car and the mobile device may detect the Wi-Fi beacon frame as part of the 802.11x protocol as well as the received signal strength of that beacon frame to approximate the distance between the Wi-Fi transceiver and the mobile device 208 but not connect to the Wi-Fi signal. In another example, the mobile device 208 may actively send a probe request looking for Wi-Fi transceivers, then a Wi-Fi transceiver (i.e. sensor 205) located in an elevator car may extract the MAC address of the mobile device 208 from the probe request and approximate distance between the Wi-Fi transceiver and the mobile device 208 from received signal strength.

In another embodiment, the mobile device 208 and the sensors 205 may communicate over a non-radio frequency network. In an example the mobile device 208 and the sensors 205 may communicate through audio transmission, such as, for example a high frequency audio transmission. The mobile device 208 may emit a chirp signature between 15 kHz-20 kHz that one or more microphones (i.e. sensor 205) can detect and extract a signature to determine which mobile device 208 is present. In this example, Audio gain at speaker may be measured to a distance between the microphone and the mobile device 208 may be determined in response to the audio gain. Advantageously, more microphones may help better determine distance. Alternatively, the speakers (i.e. sensors 205) may be located in the elevators car 103 and may emit the high frequency audit for the mobile device 208 to detect. Advantageously, one or more speakers may be help better determine distance.

The elevator call control system 200 may also include an indoor positioning system 300 comprising one or more building sensors 310 in electronic communication with the system controller 206. In an embodiment, the indoor positioning system 300 may be configured to determine how many individuals carrying mobile devices 208 are waiting for an elevator car 103 in an elevator lobby. For example, a single individual may have submitted an elevator call 302 but five individuals are planning on boarding the elevator car 103 when it arrives to pick up the individuals, which is a process known as piggy backing because the five individuals will be "piggy backing" on the elevator call 302 submitted by the single individual.

The building sensors 310 may be located throughout the building 202. The building sensors 310 may be located proximate an elevator shaft 117 of each elevator system 101. Each building sensor 310 may be configured to emit and/or detect a wireless signal. The building sensor 310 may be configured to emit a wireless signal that may be detected by the mobile device 208. The building sensor 310 may be able to detect a wireless signal emitted by mobile device 208. In an embodiment, a building sensor 310 may be a door lock that controls access to a room within the building 202. In an embodiment, a building sensor 310 may be a wireless access protocol device that provides Wi-Fi access to computing devices throughout the building 202.

The building sensors 310 may detect the location of the mobile device 208 within a building 202 using various sensing technology, such as, for example Wi-Fi transceivers, Bluetooth transceivers, radio transceivers, etc. to detect the presence of mobile devices 208 within the building 202. The type and nature of building sensors 310 within the sensor system 101 is not limited to the embodiments disclosed herein. The mobile device 208 and the building sensors 310 communicate with one another. For example, the mobile device 208 and the building sensors 310 may communicate with one another when proximate to one another (e.g., within a threshold distance). The mobile device 208 and the building sensors 310 may communicate over a wireless network, such as 802.11x (Wi-Fi), ZigBee, Z-Wave and short-range radio (Bluetooth).

In an embodiment, the building sensors 310 may include a Wi-Fi transceiver to connect to a mobile device 208 when the mobile device 208 is located within a threshold distance in order to determine the location of the mobile device 208. In another embodiment, the building sensors 310 may include a Bluetooth transceiver to connect to a mobile device 208 when the mobile device 208 is located within a threshold distance in order to determine the location of the mobile device 208. The building sensors 310 may be configured to detect a distance between each of the building sensor 310 and the mobile device 208 through wireless signal strength detection. The wireless signal strength detected between the mobile device 208 and a single building sensor 310 may be enough to approximate a location of the mobile device 208 or the indoor positioning system 300 may utilize three or more building sensors 310 to triangulate the position of the mobile device 208 utilizing the wireless signal strength detected between the mobile device 208 and each of the three building sensors 310.

Communication between the mobile device 208 and the building sensors 310 can be one-way or two-way communication. In one example, if Bluetooth is utilized then the mobile device 208 may advertise a Bluetooth signal and the building sensors 310 may receive it. In another example, the building sensors 310 may advertise a Bluetooth signal and the mobile device 208 may receive it. In another example, there may be two-way Bluetooth communication between the building sensors 310 and the mobile device 208. In another example, a the building sensor 310 may be a Wi-Fi transceiver (i.e., a wireless access protocol device) and the mobile device 208 may detect the Wi-Fi beacon frame as part of the 802.11x protocol as well as the received signal strength of that beacon frame to approximate the distance between the Wi-Fi transceiver and the mobile device 208 but not connect to the Wi-Fi signal. In another example, the mobile device 208 may actively send a probe request looking for Wi-Fi transceivers, then a Wi-Fi transceiver (i.e. building sensor 310) may extract the MAC address of the mobile device 208 from the probe request and approximate distance between the Wi-Fi transceiver and the mobile device 208 from received signal strength.

In one embodiment, the mobile device 208 may determine a distance between the mobile device 208 and each of the building sensors 310 and transmit that distance to the system controller 206 to determine the location of the mobile device 208. In another embodiment, the indoor positioning system 300 may determine a distance between the mobile device 208 and each of the building sensors 310 and transmit that distance to the system controller 206 to determine the location of the mobile device 208. The location of the mobile device 208 may be determined by the mobile device 208 or by the indoor positioning system 300. In one embodiment, the mobile device 208 may determine a distance between the mobile device 208 and each of the building sensors 310, then the mobile device 208 may use that distance to determine the location of the mobile device 208 to transmit to the system controller 206. In another embodiment, the indoor positioning system 300 may determine a distance between the mobile device 208 and each of the building sensors 310, then the indoor positioning system 300 may use that distance to determine the location of the mobile device 208 to transmit to the system controller 206.

Figure 3:
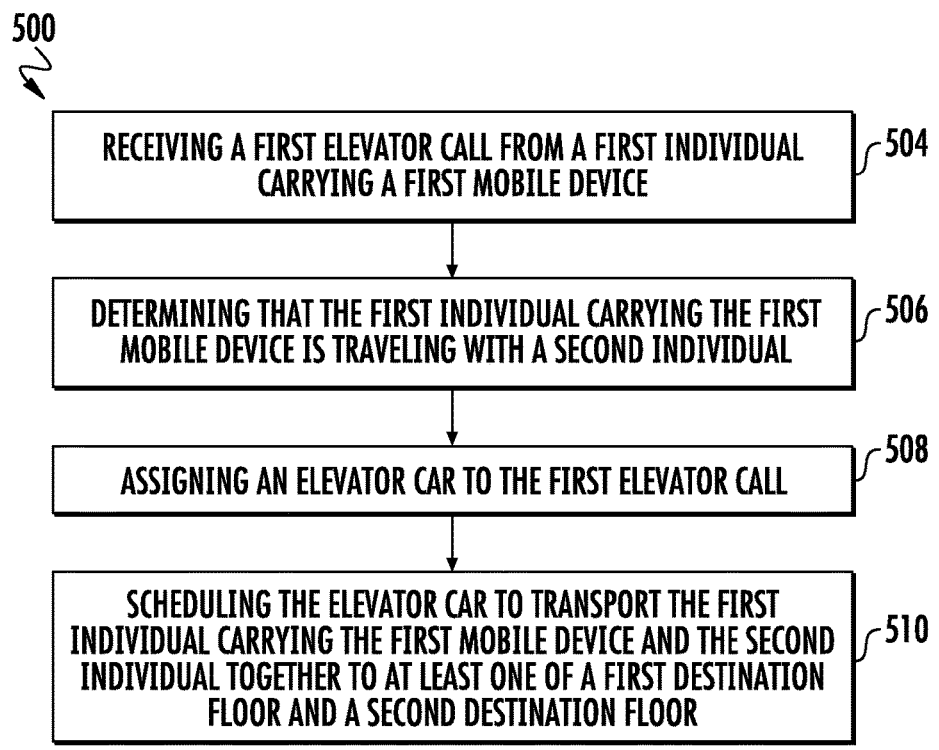
FIG. 3 is a flow diagram illustrating a method of operating an elevator call control system, according to an embodiment of the present disclosure.
Figure 4:
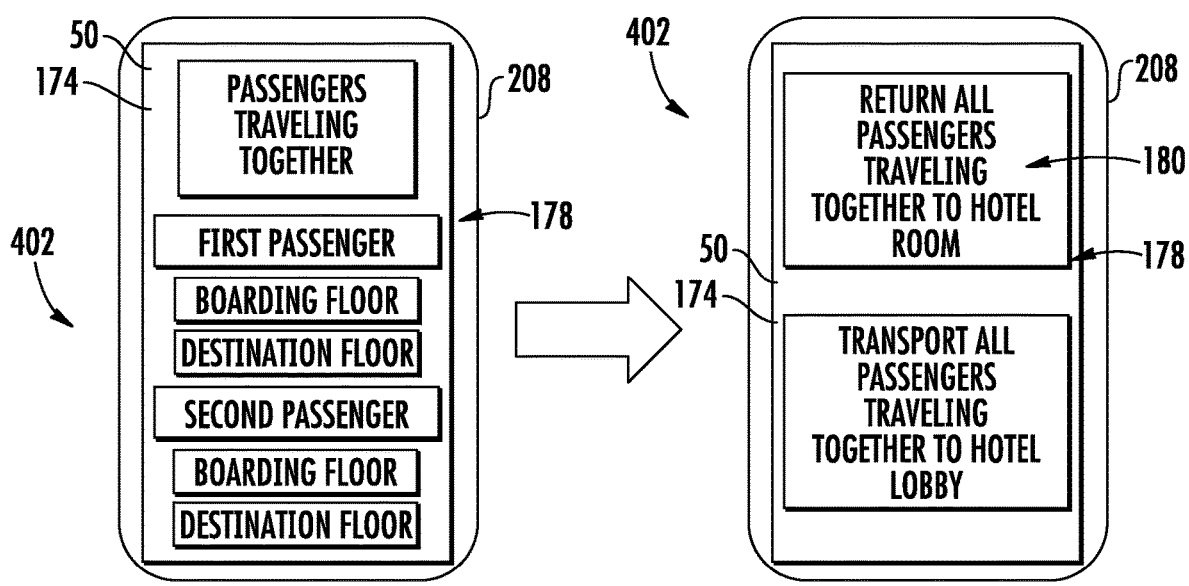
FIG. 4 illustrates a graphical user interface of a mobile device within the elevator call control system of FIG. 2, according to an embodiment of the present disclosure.
Figure 5:
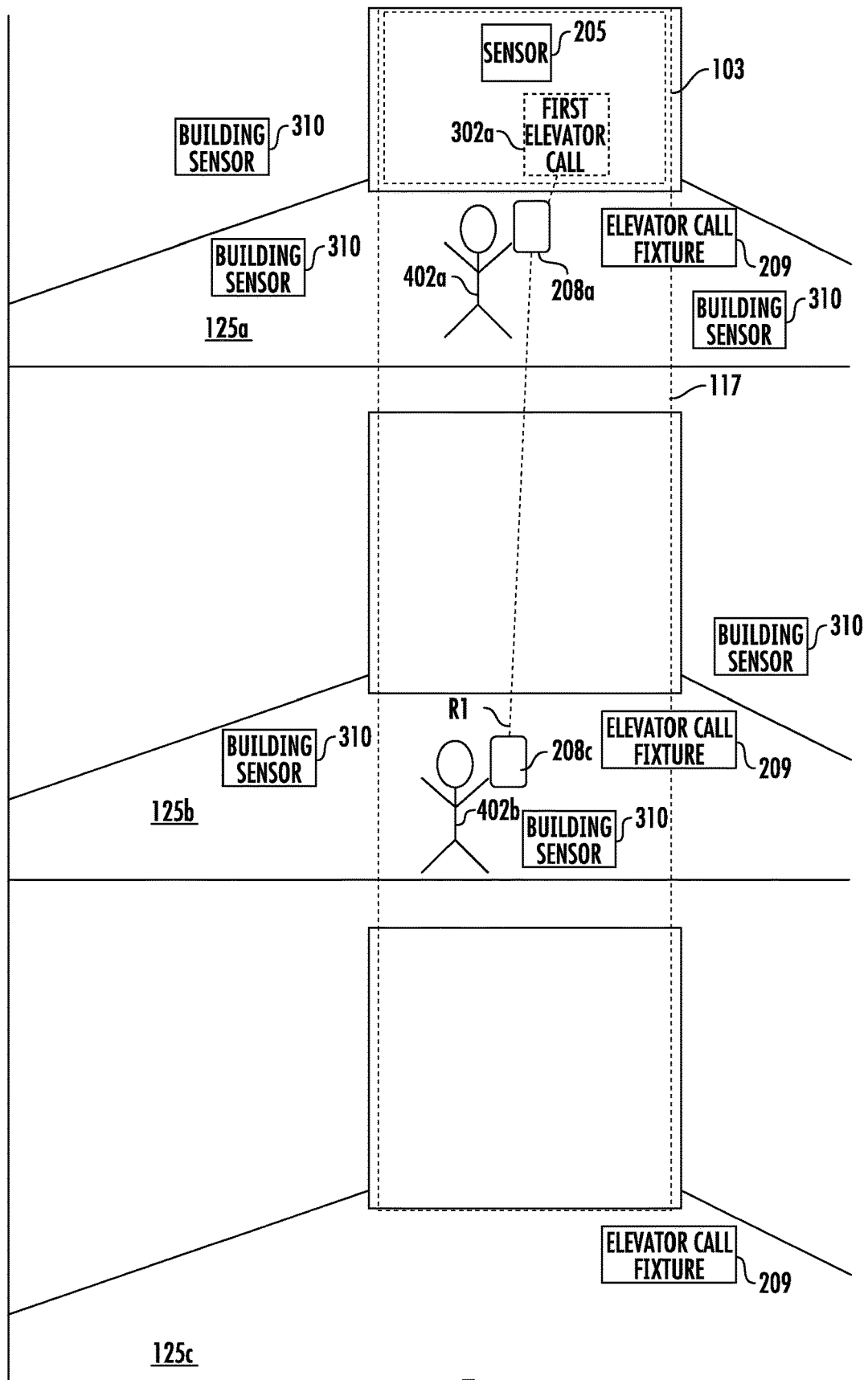
FIG. 5 illustrates a graphical illustration of the method of FIG. 3, according to an embodiment of the present disclosure.

Referring now to FIG. 3-5 with continued reference to FIGS. 1-2. FIG. 3 shows a flow chart of a method 500 of operating an elevator call control system 200. The method 500 may be performed by system controller 206. FIG. 4 illustrates a mobile device 208 graphical user interface 178 for operating the application 255. FIG. 5 illustrates a graphical representation of the method 500. The mobile device 208 may be a laptop computer, smart phone, tablet computer, smart watch, or any other mobile computing device known to one of skill in the art. In the example shown in FIG. 4, the mobile device 208 is a touchscreen smart phone. The mobile device 208 may include a display screen 174 and an input device 50, such as, example, a mouse, a touch screen, a scroll wheel, a scroll ball, a stylus pen, a microphone, a camera, etc. In the example shown in FIG. 4, since the mobile device 208 is a touchscreen smart phone, then the display screen 174 may also function as an input device 50. FIG. 4 illustrates a graphical user interface 178 on the mobile device 208. A user may interact with the graphical user interface 178 through a selection input, such as, for example, a "click", "touch", verbal command or any other input to the user interface 178.

A first individual 402a making an elevator call 302 may identify one or more other individuals traveling with the first individual 402a using the user interface 178 of the application 255. Alternatively, the application 255 may automatically identify and prepopulate the one or more other individuals traveling with the first individual 402a using the passenger database 210 and/or location determination of mobile devices 208 belonging to the one or more other individuals then display the one or more individuals on the display screen 174, as seen in FIG. 4 at 402. Once the first individual 402a and the one or more other individuals are displayed on the display screen 174, the first individual 402a may adjust the one or more other individuals through the graphical user interface 178 of the application 255.

Additionally, the first individual 402a making an elevator call 302 may identify the boarding floor and destination floor of the first individual 402a and the one or more other individuals traveling with the first individual 402a using the user interface 178 of the application 255. Alternatively, the application 255 may automatically identify and prepopulate the boarding floor and destination floor of the first individual and the one or more other individuals traveling with the first individual 402a using the passenger database 210 and/or location determination of mobile devices 208 belonging to the one or more other individuals then display the boarding floors and destination floors are displayed on the display screen 174, as seen in FIG. 4 at 402. Once the boarding floors and destination floors are displayed on the display screen 174, the first individual 402a may adjust the one or more other individuals through the graphical user interface 178 of the application 255.

The application 255 may also be configured to display short cut buttons 180 through the user interface 178 on the display screen 174, as shown at 404 in FIG. 4. For instance, the short cut buttons 180 may include short cuts such as, for example, "RETURN ALL PASSENGERS TRAVELING TOGETHER TO HOTEL ROOM" AND "TRANSPORT ALL PASSENGERS TRAVELING TOGETHER TO HOTEL LOBBY". An individual may select one of the shortcut buttons 180 to automatically generate an elevator call 302 so that all the passengers identified as travelling together in the passenger database 210 may travel within the same elevator car 103.

At block 504, a first elevator call 302a is received from a first individual 402a carrying a first mobile device 208a. The first elevator call 302a includes a destination request to travel from a first boarding floor 125a to a first destination floor. The first mobile device 208a may be determined to be located on the first boarding floor 125a by receiving a selection input from the first mobile device 208a and/or detecting a location of the first mobile device 208a. The location of the first mobile device 208a may be detected utilizing the building sensors 310, the sensor 205 of an elevator car 103, and/or a second mobile device 208b. In one example, the location of the first mobile device 208a may be determined by: connecting, using a building sensor 310, to the first mobile device 208a via at least one of Wi-Fi and Bluetooth; and determining a distance between the building sensor 310 and the first mobile device 208a. In another example, the location of the first mobile device 208a may be determined by: detecting, using a building sensor 310, a wireless signal of the first mobile device 208a, wherein the building sensor 310 does not connect to the wireless signal; and determining a distance between the building sensor 310 and the first mobile device 208a. In yet another example, the location of the first mobile device 208a may be determined by: detecting a beacon transmitted by a building sensor 310 using the first mobile device 208a; and determining a distance between the building sensor 310 and the first mobile device 208a in response to a strength of the beacon.

At block 506, it is determined that the first individual 402a carrying the first mobile device 208a is traveling with a second individual 402b. It may be determined that the first individual 402a carrying the first mobile device 208a is traveling with a second individual 402b by: receiving a selection input from the first mobile device 208a indicating that the second individual 402b is traveling with the first individual 402a. It may be determined that the first individual 402a carrying the first mobile device 208a is traveling with a second individual 402b further comprises: detecting a location of a second mobile device 208b carried by the second individual 402b; detecting a location of the first mobile device 208a; and determining that the second mobile device 208b is within a selected range R1 of the first mobile device 208a. The second mobile device 208b may be determined to be within a selected range R1 of the first mobile device 208a when the first elevator call 302a is received and/or when the elevator car 103 arrives at the first boarding floor 125a. It may also be determined that the first individual 402a carrying the first mobile device 208a is traveling with a second individual 402b by: quarrying at least one of a social media network and a hotel visitor guest database to determine whether the second individual 402b is traveling with the first individual 402a.

At block 508, an elevator car 103 is assigned to the first elevator call 302a. At block 510, the elevator car 103 is scheduled to transport the first individual 402a carrying the first mobile device 208a and the second individual 402b together to at least one of a first destination floor and a second destination floor. In an embodiment, the first destination floor is the second destination floor (e.g., the first destination floor and the second destination floor are a hotel lobby, a ground floor, gym floor, pool floor, or conference room floor). In the example shown in FIG. 5, the first destination floor and the second destination floor are a ground floor 125c.

The elevator car 103 may be scheduled to pick up the first individual 402a and the second individual 402b on the same floor or scheduled to pick up the first individual 402a and the second individual 402b on different floors, such that the first individual 402a and the second individual 402b travel together within the elevator car 103 at some point between their origin and destinations. Further, The elevator car 103 may be scheduled to transport the first individual 402a and the second individual 402b to the same floor or scheduled to transport the first individual 402a and the second individual 402b to different floors, such that the first individual 402a and the second individual 402b travel together within the elevator car 103 at some point between their origin and destinations.

The method 500 may further comprise: determining that the second individual 402b is located on a second boarding floor 125b. The second boarding floor 125b may be different than the first boarding floor 125a as shown in FIG. 5. Alternatively, the second boarding floor may also be the same as the first boarding floor (not shown), the first individual 402a and the second individual 402b may board the elevator car on the same boarding floor. It may be determined that the second individual 402b is located on a second boarding floor 125b different than the first boarding floor 125a by: receiving a selection input from the mobile device indicating that the second individual 402b is located on a second boarding floor 125b different than the first boarding floor 125a. It may be determined that the second individual 402b is located on a second boarding floor 125b different than the first boarding floor 125a by: detecting a location of a second mobile device 208b carried by the second individual 402b.

The location of the second mobile device 208b may be detected utilizing the building sensors 310, the sensor 205 of an elevator car 103, and/or the first mobile device 208a. In one example, the location of the second mobile device 208b may be determined by: connecting, using a building sensor 310, to the second mobile device 208b via at least one of Wi-Fi and Bluetooth; and determining a distance between the building sensor 310 and the second mobile device 208b. In another example, the location of the second mobile device 208b may be determined by: detecting, using a building sensor 310, a wireless signal of the second mobile device 208b, wherein the building sensor 310 does not connect to the wireless signal; and determining a distance between the building sensor 310 and the second mobile device 208b. In yet another example, the location of the second mobile device 208b may be determined by: detecting a beacon transmitted by a building sensor 310 using the second mobile device 208b; and determining a distance between the building sensor 310 and the second mobile device 208b in response to a strength of the beacon.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating an elevator call control system, the method comprising:
    receiving a first elevator call from a first individual carrying a first mobile device, the first elevator call including a destination request to travel from a first boarding floor to a first destination floor;
    determining that the first individual carrying the first mobile device is traveling with a second individual, wherein the second individual is traveling to a second destination floor;
    assigning an elevator car to the first elevator call; and
    scheduling the elevator car to transport the first individual carrying the first mobile device and the second individual together to at least one of a first destination floor and the second destination floor.

2. The method of claim 1, wherein determining that the first individual carrying the first mobile device is traveling with a second individual further comprises:
    receiving a selection input from the first mobile device indicating that the second individual is traveling with the first individual.

3. The method of claim 1, further comprising:
    determining that the second individual is located on a second boarding floor different than the first boarding floor.

4. The method of claim 3, wherein determining that the second individual is located on a second boarding floor different than the first boarding floor further comprises:
    receiving a selection input from the mobile device indicating that the second individual is located on a second boarding floor different than the first boarding floor.

5. The method of claim 3, wherein determining that the second individual is located on a second boarding floor different than the first boarding floor further comprises:
    detecting a location of a second mobile device carried by the second individual.

6. The method of claim 1, wherein determining that the first individual carrying the first mobile device is traveling with a second individual further comprises:
    detecting a location of a second mobile device carried by the second individual;
    detecting a location of the first mobile device; and
    determining that the second mobile device is within a selected range of the first mobile device.

7. The method of claim 6, wherein the second mobile device is determined to be within the selected range of the first mobile device when the first elevator call is received.

8. The method of claim 6, wherein the second mobile device is determined to be within the selected range of the first mobile device when the elevator car arrives at the first boarding floor.

9. The method of claim 1, wherein determining that the first individual carrying the first mobile device is traveling with a second individual further comprises:
    quarrying at least one of a social media network and a hotel visitor guest database to determine whether the second individual is traveling with the first individual.

10. The method of claim 1, wherein the first destination floor and the second destination floor are the same.

11. The method of claim 1, wherein the first destination floor and the second destination floor are different.

12. The method of claim 1, further comprising:
    determining the first destination floor and the second destination floor.

13. The method of claim 12, wherein determining the first destination floor and the second destination floor further comprises:
    receiving a selection input from the first mobile device indicating the first destination floor and the second destination floor.

14. The method of claim 12, wherein determining the first destination floor and the second destination floor further comprises:
    quarrying at least one of a social media network and a hotel visitor guest database to determine the first destination floor and the second destination floor.

15. The method of claim 5, wherein detecting a location of the second mobile device further comprises:

connecting, using a building sensor, to the second mobile device via at least one of Wi-Fi and Bluetooth; and
determining a distance between the building sensor and the second mobile device.

16. The method of claim 5, wherein detecting a location of the second mobile device further comprises:
detecting, using a building sensor, a wireless signal of the second mobile device, wherein the building sensor does not connect to the wireless signal; and
determining a distance between the building sensor and the second mobile device.

17. The method of claim 5, wherein detecting a location of the second mobile device further comprises:
detecting a beacon transmitted by a building sensor using the second mobile device; and
determining a distance between the building sensor and the second mobile device in response to a strength of the beacon.

18. An elevator system comprising:
an elevator car; and
a system controller comprising:
a processor; and
a memory comprising computer-executable instructions that, when executed by the processor, cause the processor to perform operations, the operations comprising:
receiving a first elevator call from a first individual carrying a first mobile device, the first elevator call including a destination request to travel from a first boarding floor to a first destination floor;
determining that the first individual carrying the first mobile device is traveling with a second individual, wherein the second individual is traveling to a second destination floor;
assigning an elevator car to the first elevator call; and
scheduling the elevator car to transport the first individual carrying the first mobile device and the second individual together to at least one of a first destination floor and the second destination floor.

19. A computer program product tangibly embodied on a computer readable medium, the computer program product including instructions that, when executed by a processor, cause the processor to perform operations comprising:
receiving a first elevator call from a first individual carrying a first mobile device, the first elevator call including a destination request to travel from a first boarding floor to a first destination floor;
determining that the first individual carrying the first mobile device is traveling with a second individual, wherein the second individual is traveling to a second destination floor;
assigning an elevator car to the first elevator call; and
scheduling the elevator car to transport the first individual carrying the first mobile device and the second individual together to at least one of a first destination floor and the second destination floor.

* * * * *